US012516320B2

(12) United States Patent
Chin et al.

(10) Patent No.: US 12,516,320 B2
(45) Date of Patent: Jan. 6, 2026

(54) METHOD OF TREATING BREAST CANCER IN A SUBJECT BY INHIBITING NIP7 AND A PHARMACEUTICAL COMPOSITION COMPRISING A NIP7 INHIBITOR

(71) Applicant: City University of Hong Kong, Kowloon (HK)

(72) Inventors: Yuet Ming Rebecca Chin, Kowloon (HK); Ye Tian, Kowloon (HK)

(73) Assignee: City University of Hong Kong, Kowloon (HK)

( * ) Notice: Subject to any disclaimer, the term of this patent is extended or adjusted under 35 U.S.C. 154(b) by 512 days.

(21) Appl. No.: 18/149,396

(22) Filed: Jan. 3, 2023

(65) Prior Publication Data

US 2024/0218359 A1 Jul. 4, 2024

(51) Int. Cl.
*C12N 15/00* (2006.01)
*A61K 45/06* (2006.01)
*A61P 35/00* (2006.01)
*C12N 9/22* (2006.01)
*C12N 15/113* (2010.01)
*C12N 15/86* (2006.01)

(52) U.S. Cl.
CPC ............ *C12N 15/113* (2013.01); *A61K 45/06* (2013.01); *A61P 35/00* (2018.01); *C12N 9/22* (2013.01); *C12N 15/86* (2013.01); *C12N 2310/20* (2017.05); *C12N 2740/15043* (2013.01)

(58) Field of Classification Search
CPC ............................ C12N 15/00; C12N 2310/20
See application file for complete search history.

(56) References Cited

FOREIGN PATENT DOCUMENTS

CN 117074541 A * 11/2023 ............. G01N 30/02

OTHER PUBLICATIONS

Mohibi et al. (2019) "Cancer the 'RBP'eutics-RNA-binding proteins as therapeutic targets for cancer" Pharmacology & therapeutics, 203, 107390, 25 pages. (Year: 2019).*
Morello et al. (2011) "The NIP7 protein is required for accurate pre-rRNA processing in human cells" Nucleic acids research, 39(2), 648-665. (Year: 2011).*
Graveley et al. (Oct. 14, 2020) "Graveley Lab CRISPR Genome Editing followed by RNA-seq Biosample Preparation and Characterization Document" UConn Institute for Systems Genomics, Department of Genetics and Genome Sciences, Farmington, CT 06030 USA, 10 pages, retrieved online: graveleylab.cam.uchc.edu/ENCODE/ ENCODE_DATA/protocol/ LV42_biosample_protocol/NIP7-BGKcLV11-68.pdf. (Year: 2020).*
Xu et al. (2018) "Integrative Bayesian analysis identifies rhabdomyosarcoma disease genes" Cell reports, 24:238-251. (Year: 2018).*
Aubrey et al., 2015, Cell Reports 10, 1422-1432 Mar. 3, 2015 ª2015 the Authors http://dx.doi.org/10.1016/j.celrep.2015.02.002.
6 2 | Nature | vol. 490 | Oct. 4, 2012 doi:10.1038/nature11412; Comprehensive molecular portraits of human breast tumours.
Ciriello et al., 2015, Cell 163, 506-519; Oct. 8, 2015 ª2015 Elsevier Inc.; http://dx.doi.org/10.1016/j.cell.2015.09.033; Comprehensive Molecular Portraits of Invasive Lobular Breast Cancer.
Defining super-enhancer landscape in triple-negative breast cancer by multiomic profiling Hao Huang1,6 Nature Communications | (2021) 12:2242 | https://doi.org/10.1038/s41467-021-22445-0 | www.nature.com/naturecommunications.
Identification of human triple-negative breast cancer subtypes and preclinical models for selection of targeted therapies Lehmann et al; The Journal of Clinical Investigation http://www.jci.org vol. 121 No. Jul. 7, 2011.
Cancer Res; 74(3) Feb. 1, 2014; Tumor and Stem Cell Biology Targeting Akt3 Signaling in Triple-Negative Breast Cancer; Y. Rebecca Chin et al; http://aacrjournals.org/cancerres/article-pdf/74/ 3/964/2709971/964.
http://dx.doi.org/10.1016/j.bbadis.2013.12.009; Targeting the nucleolus for cancer intervention; J.E. Quin et al. / Biochimica et Biophysica Acta 1842 (2014) 802-816.
648-665 Nucleic Acids Research, 2011, vol. 39, No. 2 Published online Aug. 26, 2010 doi:10.1093/nar/gkq758; The NIP7 protein is required for accurate pre-rRNA processing in human cells Luis G. Morello.
Histopathology 2009, 54, 753-762. DOI: 10.1111/j.1365-2559.2008. 03168.x; What the nucleolus says to a tumour pathologist Massimo Derenzini.

* cited by examiner

*Primary Examiner* — James Joseph Graber
(74) *Attorney, Agent, or Firm* — Renner, Kenner, Greive, Bobak, Taylor & Weber

(57) ABSTRACT

A method of inhibiting NIP7 gene expression in a triple-negative breast cancer cell and a method of treating or controlling a cancer or tumor mediated by NIP7 overexpression includes the step of administering a gRNA molecule into the cancer cell or subject. The gRNA molecule includes a complementary sequence to a NIP7 gene. A pharmaceutical composition for treating triple-negative breast cancer includes an effective amount of a gRNA molecule comprising a complementary sequence to a NIP7 gene.

16 Claims, 13 Drawing Sheets

Specification includes a Sequence Listing.

METHOD OF TREATING BREAST CANCER IN A SUBJECT BY INHIBITING NIP7 AND A PHARMACEUTICAL COMPOSITION COMPRISING A NIP7 INHIBITOR

SEQUENCE LISTING

The Sequence Listing file entitled "MKCP690SL" having a size of 7,671 bytes and creation date of Dec. 9, 2022, that was electronically filed with the patent application is incorporated herein by reference in its entirety.

FIELD OF THE INVENTION

The invention relates to a method of treating or controlling a cancer or tumor mediated by NIP7 overexpression. Particularly, this invention relates to a method of treating or controlling a cancer or tumor by using guide RNA (gRNA) molecules.

BACKGROUND

Breast cancer is the most common cancer affecting women worldwide. Despite recent improvements in mortality of breast cancer, this disease remains the second most common cause of death in women. Breast cancer has been categorized into three major subtypes: luminal, HER2+/ER−, and basal-like. The majority of basal-like tumors (~70%) are triple-negative (ER−/PR−/HER2−). Chemotherapy, usually with high toxicity, is the main treatment option for basal-like, triple-negative breast cancer (TNBC). Thus, there is an urgent clinical need to identify novel therapeutic targets for this aggressive subtype.

TNBC is currently the only primary breast tumor subtype without effective targeted therapy and, as a consequence, has poor outcomes in general. Chemotherapy, usually with life-threatening toxicity, is the main treatment option for TNBC. Because of the poor prognosis and a more aggressive phenotype, there is an urgent clinical need to identify novel molecular therapeutic targets and approaches to improve the survival of patients with this subtype of breast cancer.

It is well established that the nucleolus, being a hub for ribosome biogenesis, plays a vital role in cancer development. Nucleolar hypertrophy can be used as a prognostic marker for certain cancers. In addition to ribosome production, this dynamic structure is now recognized to regulate a repertoire of tumor cell activities, including stress signaling, regulation of cell cycle and senescence. Targeting the nucleolus has emerged as a novel therapeutic strategy. Notably, RNA Polymerase I (Pol I) inhibitors which block the transcription of ribosomal RNA (rDNA), have been shown to selectively kill tumor cells while sparing the normal cells. Indeed, Pol I inhibitor CX-5461 (Senhwa Biosciences), which exhibits a high anti-proliferative effect in a broad range of mouse tumor models, is currently in Phase II trial for TNBC patients. NIP7 is a gene playing an essential role in ribosome biogenesis. Inside the nucleolus, NIP7 has been shown to regulate pre-rRNA processing by interacting with regulatory proteins, including RPS19, Nop132, and Par14. In multiple human cell lines, downregulation of NIP7 affected ribosome biogenesis, causing an imbalance of the 40S/60S subunit ratio, and resulting in inhibition of cell proliferation. However, the role of NIP7 in human cancers has not been identified.

SUMMARY OF THE INVENTION

An embodiment of the present invention relates to a method of inhibiting NIP7 gene expression in a triple-negative breast cancer cell, including the step of administering a gRNA molecule into the triple-negative breast cancer cell, where the gRNA molecule includes a complementary sequence to a NIP7 gene.

An embodiment of the present invention also relates to a method of treating or controlling a cancer or tumor mediated by NIP7 overexpression, including the step of administering an effective amount of a gRNA molecule to a subject, where the gRNA molecule includes a complementary sequence to a NIP7 gene.

An embodiment of the present invention also relates to a pharmaceutical composition for treating triple-negative breast cancer including an effective amount of a gRNA molecule including a complementary sequence to a NIP7 gene.

Without intending to be limited by theory, it is believed that the present invention may provide a method of inhibiting NIP7 expression in a triple-negative breast cancer cell by gRNA molecules of SEQ ID NO. 1 and SEQ ID NO. 2. The present invention may provide a method of inhibiting NIP7 expression in a triple-negative breast cancer cell by introducing a lentivector particle that expresses the gRNA molecule. The present invention may provide a method of inhibiting NIP7 expression in a triple-negative breast cancer cell by introducing a lentivector particle, further including a suitable promoter for expressing the gRNA molecule. The present invention may provide a method of inhibiting NIP7 expression in a triple-negative breast cancer cell by introducing a lentivector particle, further including a sequence that encodes a Cas9 protein. The present invention may further provide a method of treating or controlling a cancer or tumor mediated by NIP7 overexpression by administering the gRNA molecule of SEQ ID NO. 1 and SEQ ID NO. 2. The present invention may further provide a method of treating or controlling a cancer or tumor mediated by NIP7 overexpression by injecting a lentivector particle that expresses the gRNA molecule. The present invention may further provide a method of treating or controlling a cancer or tumor mediated by NIP7 overexpression by injecting a lentivector particle that further includes a suitable promoter for expressing the gRNA molecule. The present invention may further provide a method of treating or controlling a cancer or tumor mediated by NIP7 overexpression by injecting a lentivector particle that further includes a sequence that encodes a Cas9 protein. The present invention may further provide a method of treating or controlling triple-negative breast cancer by administering the gRNA molecule. The present invention may further provide a method of treating or controlling a cancer or tumor mediated by NIP7 overexpression by administering an effective amount of an additional agent of a PI3K/Akt pathway inhibitor, a CDK4/6 inhibitor, a MEK inhibitor a CTLA-4 inhibitor, a PDL1 inhibitor and/or a chemotherapeutic agent. The present invention may further provide a pharmaceutical composition for treating triple-negative breast cancer including PI3K/Akt pathway inhibitor, a CDK4/6 inhibitor, a MEK inhibitor, a CTLA-4 inhibitor, a PDL1 inhibitor, and/or a chemotherapeutic agent. The present invention may further provide a pharmaceutical composition for treating triple-negative breast cancer including gRNA molecules of SEQ ID NO. 1 and SEQ ID NO. 2. The present invention may provide a pharmaceutical composition for treating triple-negative breast cancer further including a lentivector particle that expresses the gRNA molecule. The present invention may provide a pharmaceutical composition for treating triple-negative breast cancer including a lentivector particle that further includes a suitable promoter for expressing the gRNA molecule. The present invention may provide a pharmaceutical composition for treating triple-negative breast cancer including a lentivector particle that further includes a sequence that encodes a Cas9 protein. The present invention may provide a pharmaceutical composition for treating triple-negative breast cancer including a lentivector particle that further includes H1 promoter. The present invention may further provide a pharmaceutical composition for treating triple-negative breast cancer further including a pharmaceutically-acceptable agent selected from the group consisting of a carrier, an adjunct, a filler, a coating, a preservative and an additional agent.

This invention demonstrates that NIP7 is a critical regulator for the growth of TNBC. It is therefore believed that a CRISPR/cas9 approach with gRNA molecules targeted against NIP7 can show greater therapeutic efficacy with less toxicity than chemotherapy.

This invention is directed to the treatment of breast cancer in a subject, particularly triple-negative breast cancer, with guide RNA (gRNA) molecules for modifying the genetic code of the NIP7 gene, thereby inhibiting the expression of NIP7, and a pharmaceutical composition comprising such a gRNA molecule. The gRNA molecules comprise a nucleotide sequence that is 20 nucleotides in length and complementary to a part of the NIP7 gene. The invention relates to methods for treating cancers caused by elevated expression of NIP7.

Figure 1A:
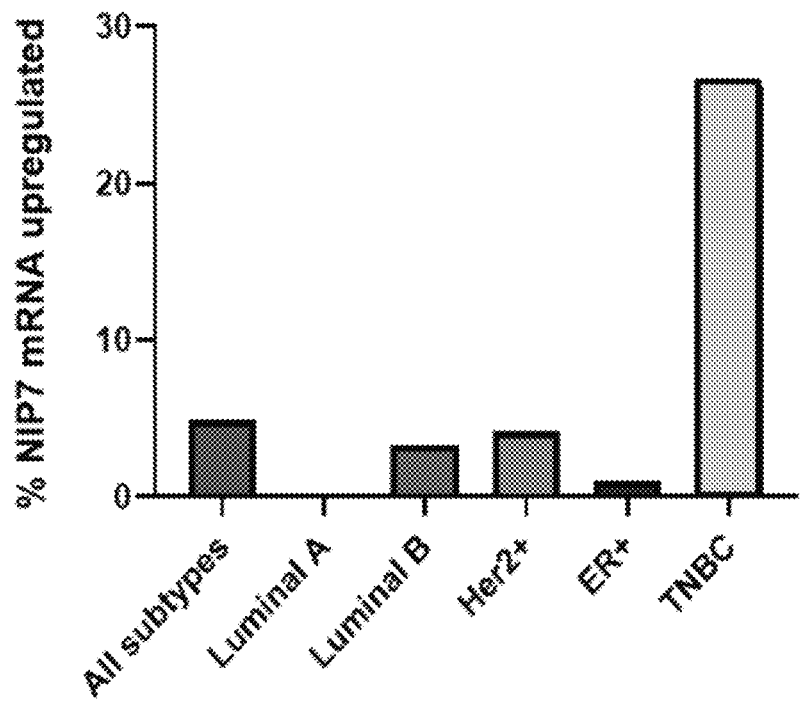
FIG. 1a is a graph showing the percentage of breast tumors with NIP7 mRNA upregulation.

The figures herein are for illustrative purposes only and are not necessarily drawn to scale.

DESCRIPTION OF THE PREFERRED EMBODIMENTS

Unless otherwise specifically provided, all tests herein are conducted at standard conditions which include a room and testing temperature of 25° C., sea level (1 atm.) pressure, pH 7, and all measurements are made in metric units. Furthermore, all percentages, ratios, etc. herein are by weight, unless specifically indicated otherwise. Data quantifications are expressed as mean±s.e.m. The asterisks represent significant differences at  $p<0.01$, * $p<0.001$.

It is understood that unless otherwise specifically noted, the materials compounds, chemicals, etc. described herein are typically commodity items and/or industry-standard items available from a variety of suppliers worldwide.

An embodiment of the present invention relates to a method of inhibiting NIP7 gene expression in a triple-negative breast cancer cell, including the step of administering a gRNA molecule into the triple-negative breast cancer cell, where the gRNA molecule includes a complementary sequence to a NIP7 gene.

Without intending to be limited by theory, it is believed that the gRNA molecules designed in the present invention inhibit NIP7 expression in cells. NIP7 overexpression is especially found in triple-negative breast cancer cells. So NIP7 is well suited to be targeted for therapeutic purposes. The present invention demonstrates that NIP7 is a critical regulator for the growth of TNBC and designs CRISPR/Cas9 system with gRNA molecules against NIP7. The designed gRNA molecules show greater therapeutic efficacy with less toxicity than chemotherapy. The gRNA molecules can significantly decrease the expression of NIP7 in TNBC cells. And the depletion of NIP7 inhibits TNBC cell proliferation in 3D and 2D cultures, and colony formation. In addition, NIP7 expression is essential for TNBC spheroid maintenance and tumor growth in mice. NIP7 knockout significantly inhibits TNBC xenograft growth. These noteworthy results indicate that inhibiting the overexpression of NIP7 by gRNA molecules is a novel therapeutic strategy for TNBC.

In an embodiment herein, the gRNA molecule includes a sequence selected from the group of SEQ ID NO. 1, SEQ ID NO. 2 and a combination thereof.

In an embodiment herein, the administration step further includes introducing a lentivector particle, where the lentivector particle expresses the gRNA molecule. A lentiviral vector can get into human tumor cells with high efficiency. Therefore, an effective amount of gRNA could be expressed using a lentiviral vector.

In an embodiment herein, the lentivector particle further includes a suitable promoter for expressing the gRNA molecule. A suitable promoter that contains sequence features to allow regulatory element binding and initiation of transcription. A suitable promoter, for example, but not limited to, H1 promoter. A lentivector particle contains an H1 promoter that efficiently drives gRNA expression.

In an embodiment herein, the lentivector particle further includes a sequence that encodes a Cas9 protein. The Cas9 proteins are enzyme acting like molecular scissors to cut DNA at a specific location. The cutting location on the genome is specified by gRNA molecules. Once the DNA is cut, the cell's natural repair machinery repairs the cut, a process that can disrupt a disease-causing gene and prevent the expression of that particular gene.

Another embodiment herein, a method of treating or controlling a cancer or tumor mediated by NIP7 overexpression, including the step of administering an effective amount of a gRNA molecule to a subject, where the gRNA molecule includes a complementary sequence to the NIP7 gene.

In an embodiment herein, the gRNA molecule includes a sequence selected from the group of SEQ ID NO. 1, SEQ ID NO. 2 and a combination thereof.

In an embodiment herein, the administration step further includes introducing a lentivector particle, where the lentivector particle expresses the gRNA molecule. A lentiviral vector can get into human tumor cells with high efficiency. Therefore, an effective amount of gRNA could be expressed using a lentiviral vector.

In an embodiment herein, the lentivector particle further includes a suitable promoter for expressing the gRNA molecule. A suitable promoter that contains sequence features to allow regulatory element binding and initiation of transcription. A suitable promoter, for example, but not limited to, H1 promoter. A lentivector particle contains an H1 promoter that efficiently drives gRNA expression.

In an embodiment herein, the lentivector particle further includes a sequence that encodes a Cas9 protein. The Cas9 proteins are enzyme acting like molecular scissors to cut DNA at a specific location. The cutting location on the genome is specified by gRNA molecules. Once the DNA is cut, the cell's natural repair machinery repairs the cut, a process that can disrupt a disease-causing gene and prevent the expression of that particular gene.

In an embodiment herein, the cancer is triple-negative breast cancer.

In an embodiment herein, the method further includes the step of administering an effective amount of an additional agent selected from the group of a PI3K/Akt pathway inhibitor, a CDK4/6 inhibitor, a MEK inhibitor, a chemotherapeutic agent and a combination thereof.

Another embodiment herein, a pharmaceutical composition for treating triple-negative breast cancer including an effective amount of a gRNA molecule including a complementary sequence to a NIP7 gene.

In an embodiment herein, the pharmaceutical composition further includes an effective amount of an additional agent selected from the group consisting of a PI3K/Akt pathway inhibitor, a CDK4/6 inhibitor, a MEK inhibitor, a CTLA-4 inhibitor, a PDL1 inhibitor, a chemotherapeutic agent and a combination thereof.

In an embodiment herein, the gRNA molecule includes a sequence selected from the group of SEQ ID NO. 1, SEQ ID NO. 2 and a combination thereof.

In an embodiment herein, the pharmaceutical composition further includes a lentivector particle, where the lentivector particle expresses the gRNA molecule.

In an embodiment herein, the lentivector particle further includes a suitable promoter for expressing the gRNA molecule.

In an embodiment herein, the lentivector particle further includes a sequence that encodes a Cas9 protein.

In an embodiment herein, the promoter is H1 promoter.

In an embodiment herein, the pharmaceutical composition further includes a pharmaceutically-acceptable agent selected from the group of a carrier, an adjunct, a filler, a coating, a preservative, an additional agent and a combination thereof.

Figure 1B:
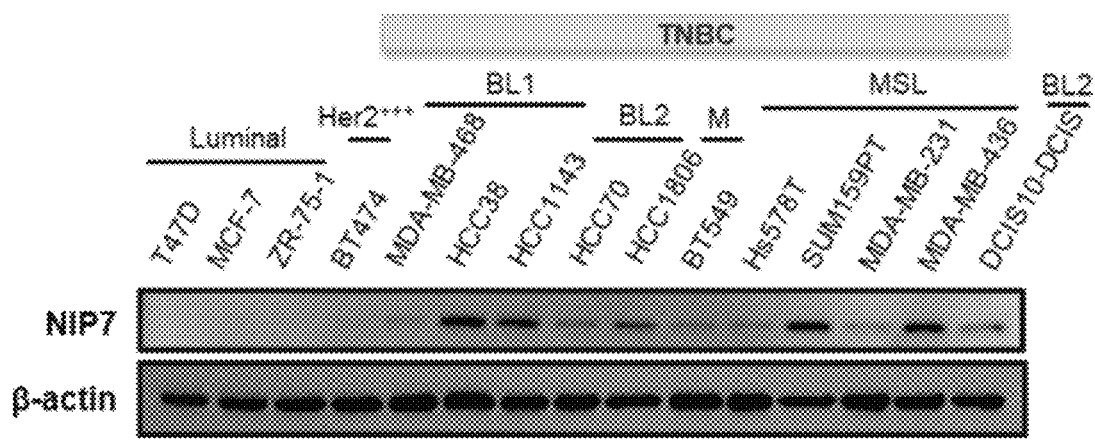
FIG. 1b is an immunoblot of NIP7 gene expression in a panel of breast cancer lines.

Turning to the figures, FIG. 1a shows that NIP7 expression is significantly higher in 26% of TNBC cases. In contrast, 3% of luminal breast tumor cases show an upregulated NIP7 level. The dataset is from The Cancer Genome Atlas FIG. 1b shows that NIP7 expression is higher in TNBC cell lines (BL1, BL2, M and MSL) as compared to the luminal or Her2-overexpressed cell lines.

Figure 1C:
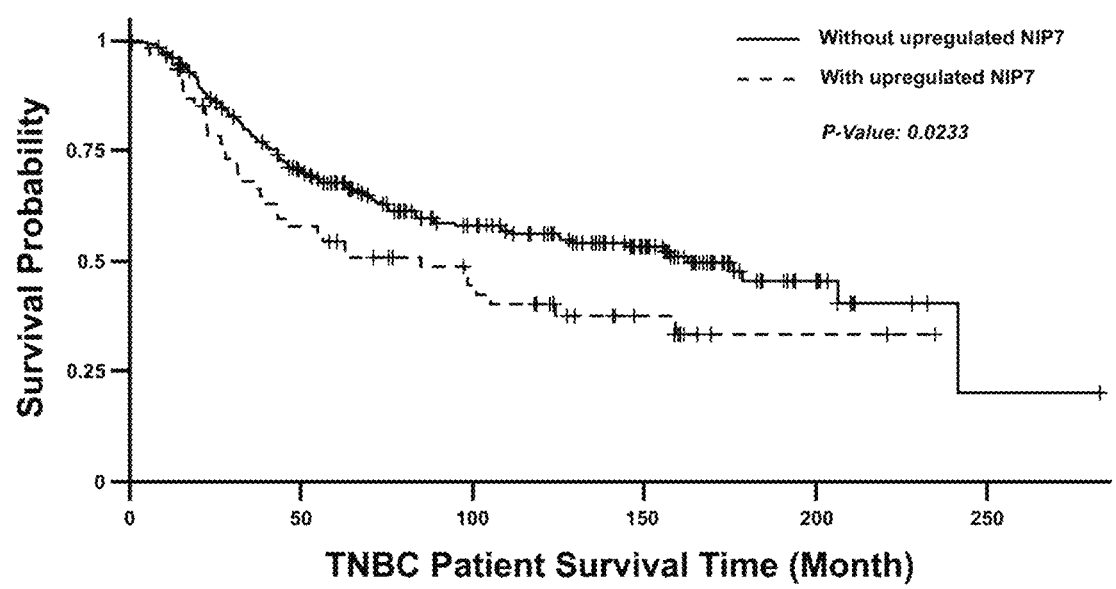
FIG. 1c is a graph showing the survival probability of TNBC patients with and without NIP7 overexpression.
Figure 1D:
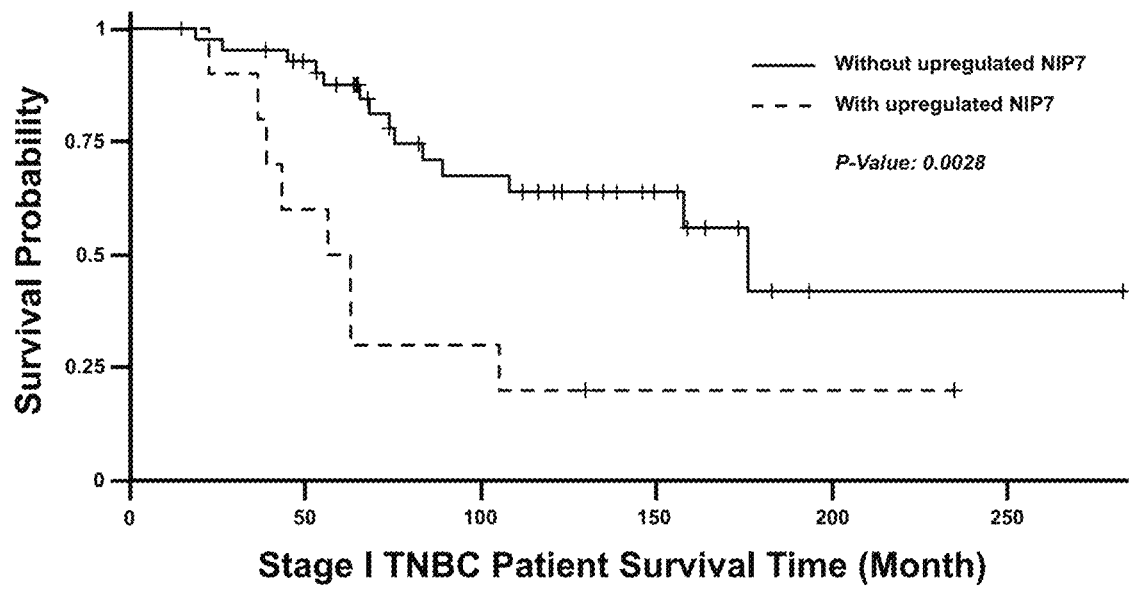
FIG. 1d is a graph showing the survival probability of Stage I TNBC patients with or without NIP7 overexpression.
Figure 1E:
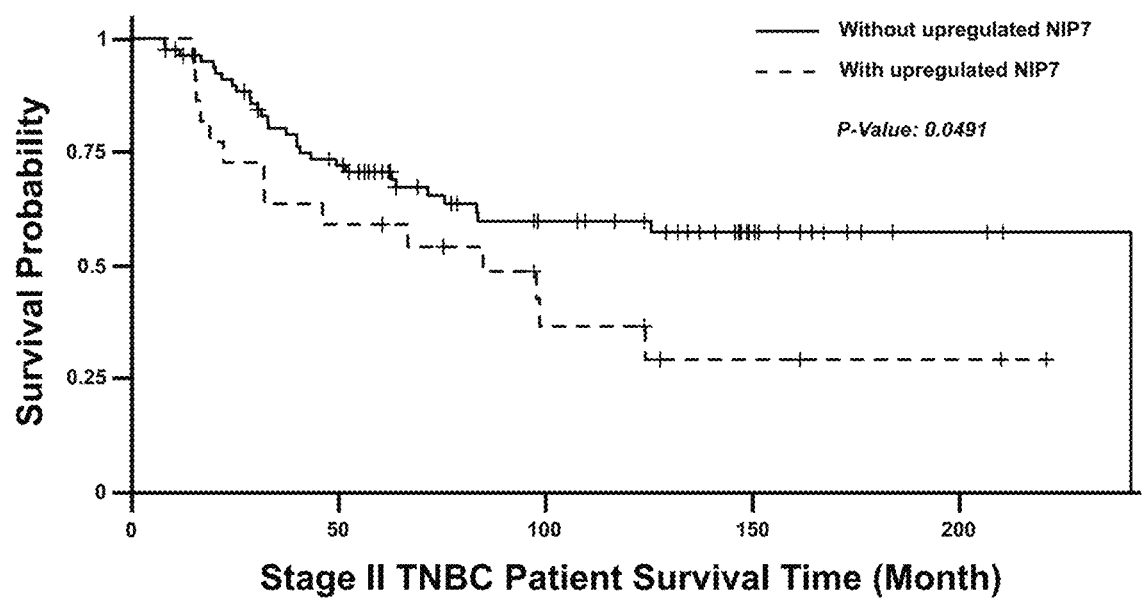
FIG. 1e is a graph showing the survival probability of Stage II TNBC patients with or without NIP7 overexpression.

FIGS. 1c-1e illustrate that the survival probability of TNBC patients with upregulated NIP7 expression is smaller than those without NIP7 overexpression. Without intending to be limited by theory, it is believed that higher expression of NIP7 is highly likely relevant to the death of TNBC patients.

Figure 1F:
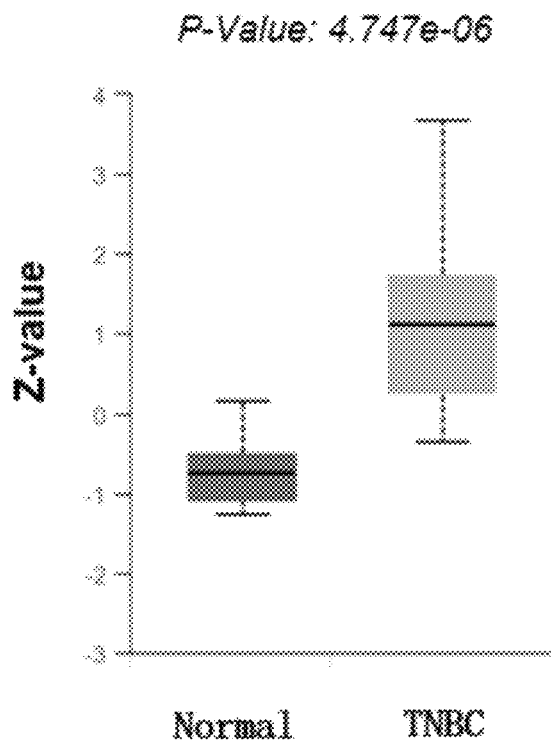
FIG. 1f is a graph showing Z-values (standard deviations from the median across samples for the given cancer type) of NIP7 protein levels in normal tissues and TNBC tumors.

FIG. 1f shows that NIP7 expression is relatively lower in normal tissues than in TNBC primary tumors. Therefore, it is believed that NIP7 is well suited to be targeted for therapeutic purposes of TNBC.

Figure 2A:
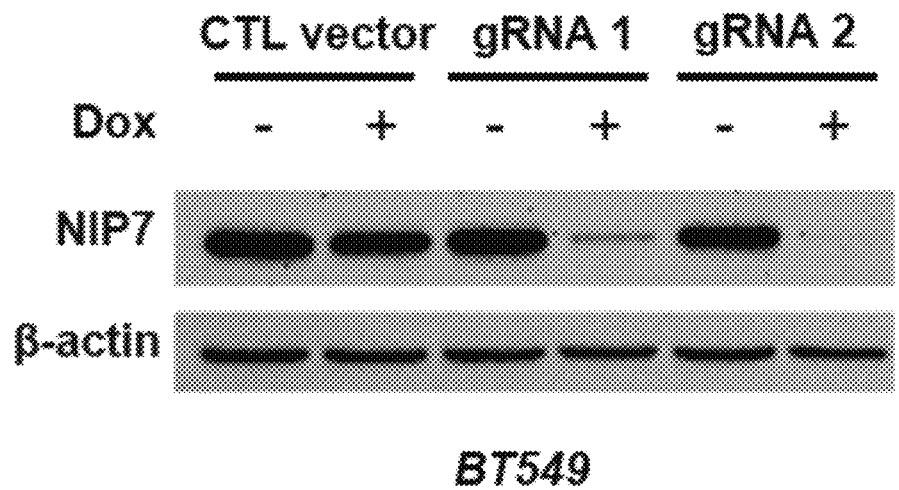
FIG. 2a is an immunoblot showing NIP7 and β-actin expression in BT549 cells infected with control vector, gRNA1 and gRNA2 and treated with or without doxycycline, respectively.
Figure 2B:
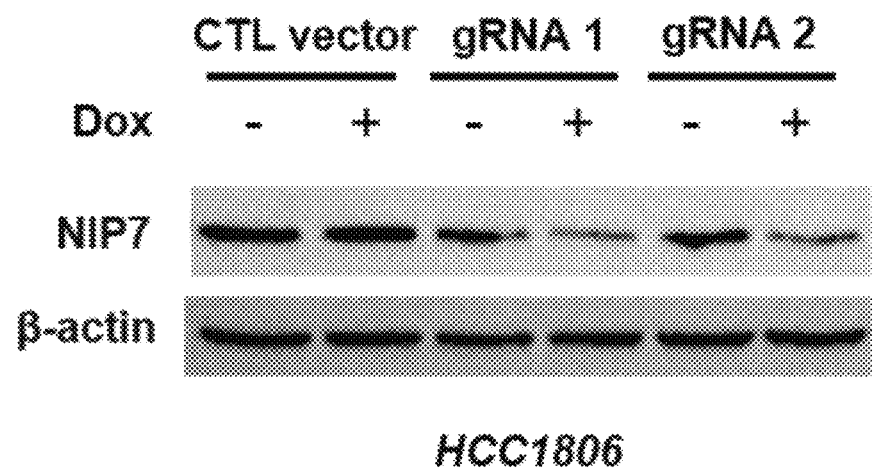
FIG. 2b is an immunoblot showing NIP7 and β-actin expressions in HCC1806 cells infected with control vector, gRNA1 and gRNA2 and treated with or without doxycycline, respectively.

FIGS. 2a and 2b show that NIP7 expression is hardly detected in both gRNA-molecule-infected BT549 and HCC1806 cells treated with doxycycline (dox) compared with the control. It is believed that gRNA1 and gRNA2 are two independent guide RNAs targeting at NIP7 gene.

Figure 2C:
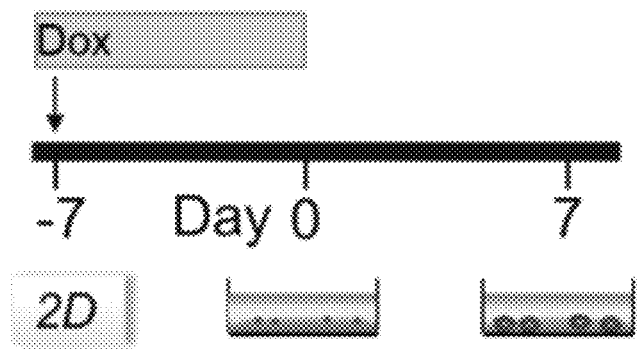
FIG. 2c is a diagram showing the schedule of the doxycycline treatment and the 3D spheroid assay.

FIG. 2c shows a schedule of the 3D spheroid assay indicating that NIP7 knockout is induced by dox treatment for 7 days. Cells are then seeded and grown in 3D cultures for 7 days.

Figure 2D:
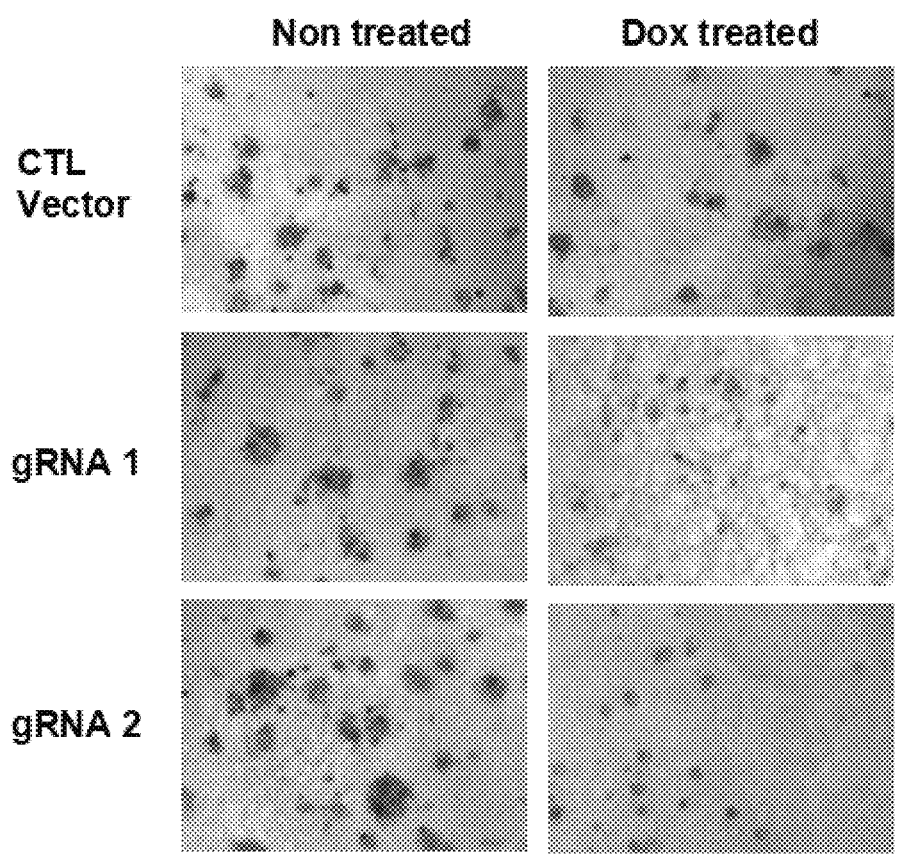
FIG. 2d is representative phase-contrast images of 3D spheroids of BT549 cell lines infected with control vector, gRNA1 and gRNA2 and treated with or without doxycycline in 3D spheroid morphogenesis assay, respectively.
Figure 2E:
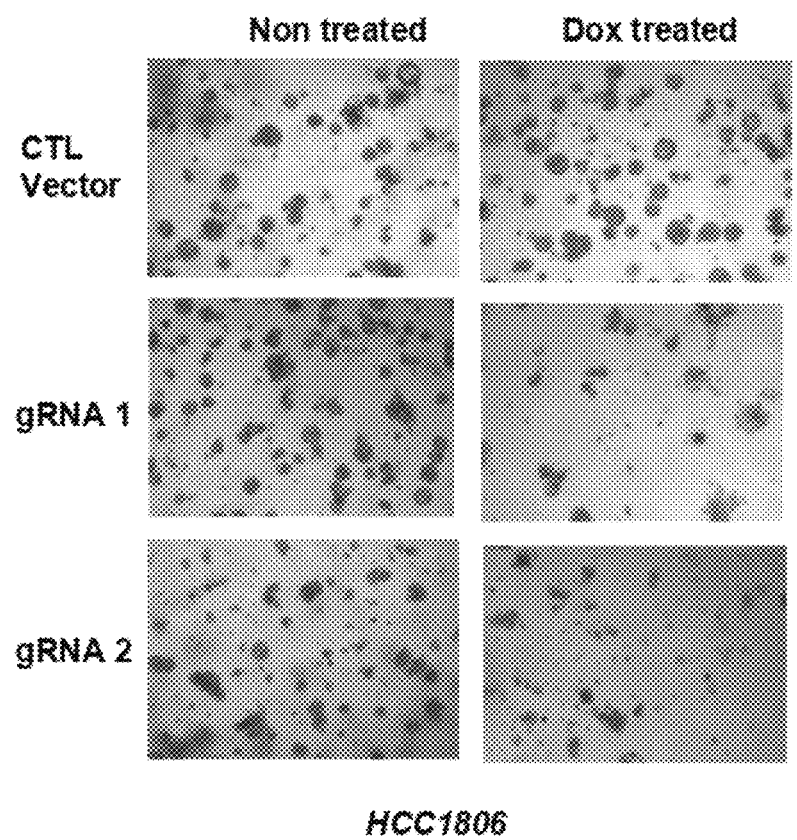
FIG. 2e is representative phase-contrast images of 3D spheroids of HCC1806 cell lines infected with control vector, gRNA1 and gRNA2 and treated with or without doxycycline, respectively.

Cell images of the 3D spheroid assay in FIGS. 2d and 2e illustrate that gRNA molecules significantly inhibit NIP7 expression in both BT549 and HCC1806 cells treated with doxycycline compared with the control. In contrast, doxycycline administration to cancer cells infected with the control vector has no effect on proliferation.

Figure 2F:
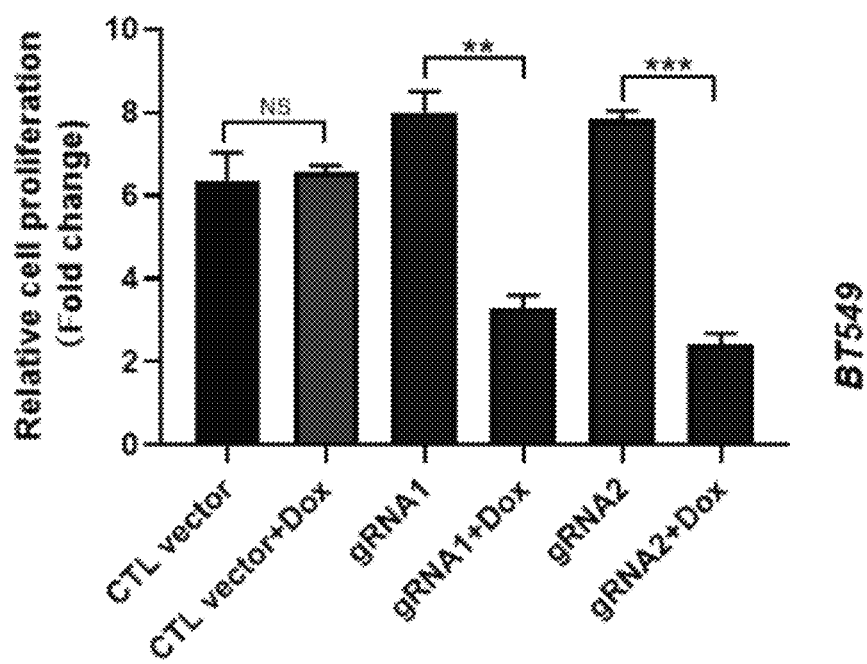
FIG. 2f is a graph showing the relative 2D cell proliferation of BT549 cells infected with control vector, gRNA1 and gRNA2, and treated with or without doxycycline, respectively.

FIG. 2f shows 2D cell viability assay results. It is believed that NIP7 knockout in BT549 cells leads to a significant decrease in cell proliferation compared to non-dox-treated cells. In contrast, doxycycline administration to cancer cells infected with the control vector has no effect on proliferation.

Figure 2G:
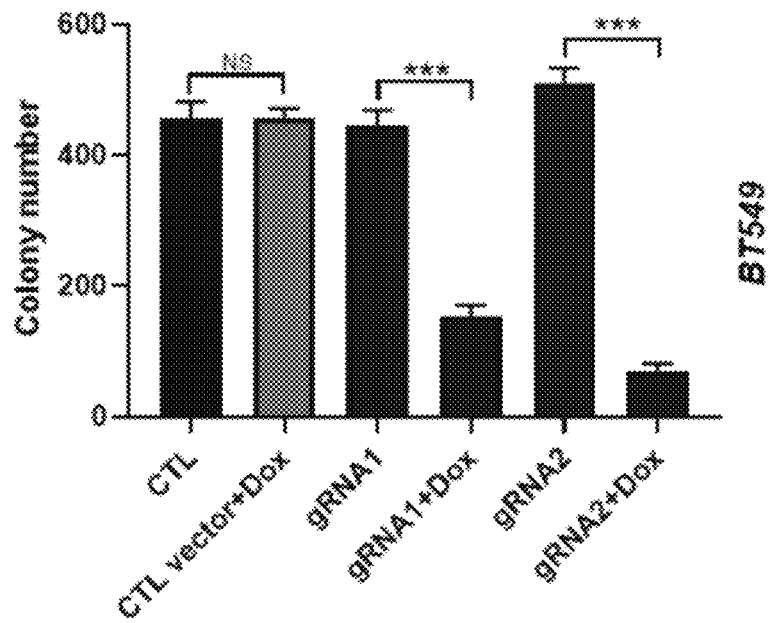
FIG. 2g is a graph showing the colony numbers of BT549 cells infected with control vector, gRNA1 and gRNA2 and treated with or without doxycycline, respectively.
Figure 2H:
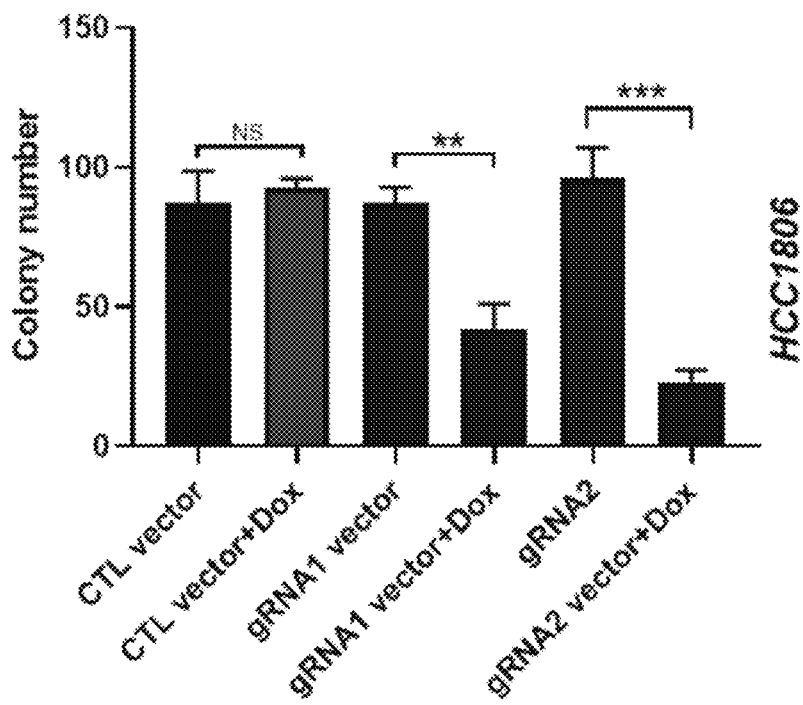
FIG. 2h is a graph showing the colony numbers of HCC1806 cells infected with control vector, gRNA1 and gRNA2 and treated with or without doxycycline, respectively.

FIGS. 2g and 2h show clonogenic assays. It is believed that NIP7 knockout significantly inhibits colony formation ability of both BT549 and HCC1806 cells compared with non-dox treated cells. Therefore, it is believed that these results demonstrate the critical roles of gRNA1 and gRNA2 in regulating the progeny-producing capability of TNBC cells.

Figure 3A:
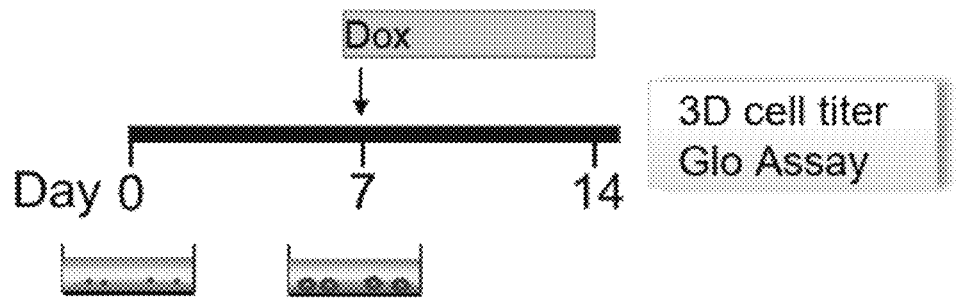
FIG. 3a is a diagram showing the schedule of doxycycline treatment and 3D cell titer glo assay.

FIG. 3a shows a schedule of a 3D cell titer Glo assay. Cells are grown into spheroids for 7 days in 3D culture, followed by dox treatment to induce NIP7 knockout.

Figure 3B:
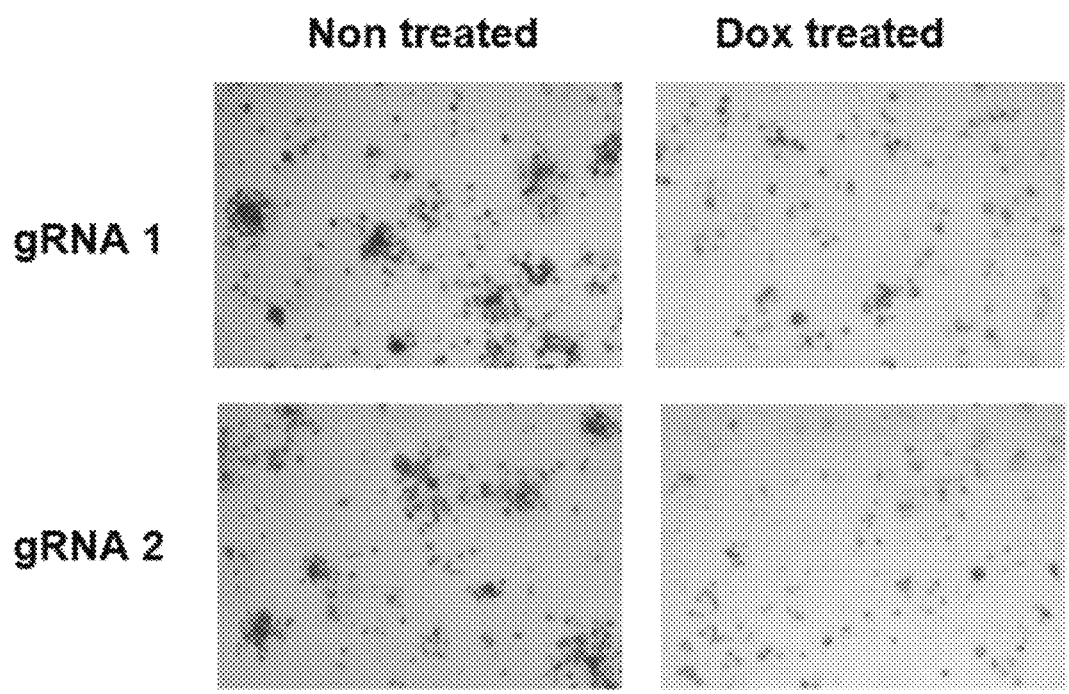
FIG. 3b is representative phase-contrast images of 3D spheroids of BT549 cells infected with gRNA1 and gRNA2 and treated with or without doxycycline on Day 14 of the 3D spheroid maintenance assay, respectively.

The cell images in FIG. 3b illustrate that depletion of NIP7 significantly influences BT549 tumor spheroid maintenance.

Figure 3C:
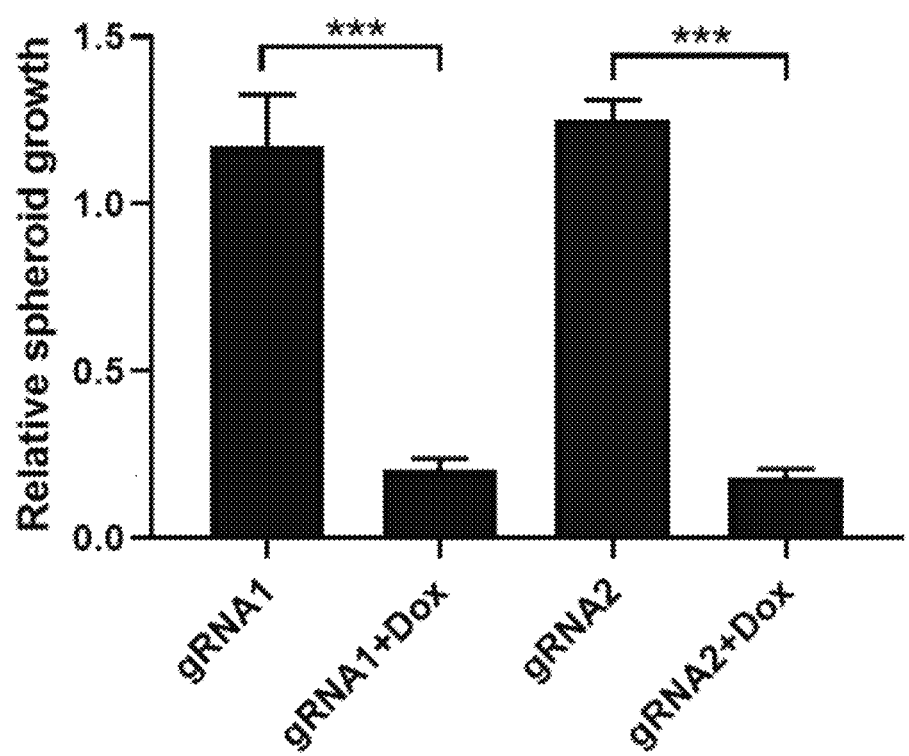
FIG. 3c is a graph showing the relative spheroid growth of 3D spheroids of BT549 cells infected with gRNA1 and gRNA2 and treated with or without doxycycline in 3D cell titer glo assay, respectively.

FIG. 3c shows graphs that confirm the result of FIG. 3b and indicate the spheroid growth. It is believed that these results indicate that NIP7 knockout in BT549 cells leads to a significant decrease in spheroid growth compared to non-dox treated cells in 3D culture.

Figure 3D:
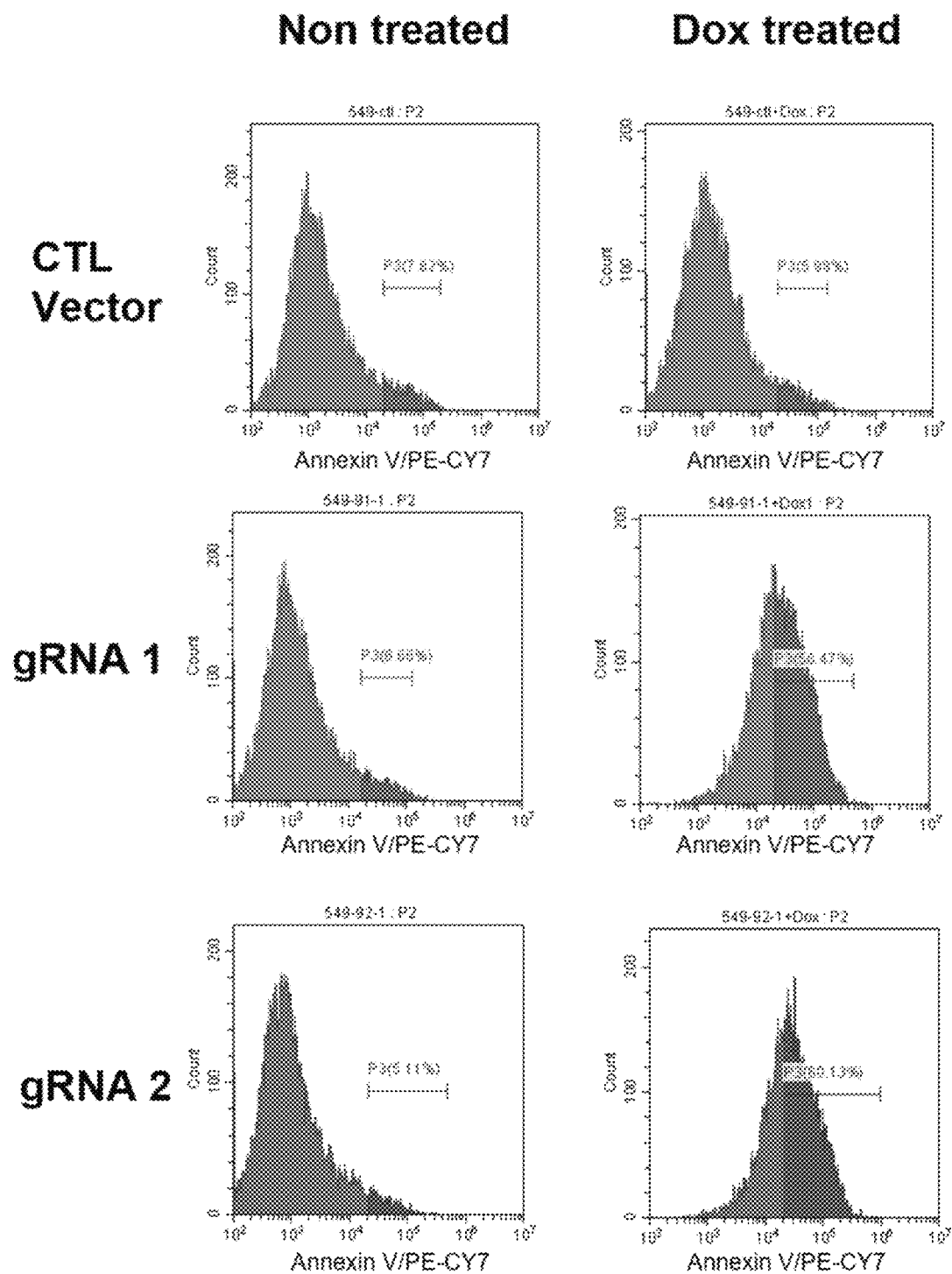
FIG. 3d shows the flowcytometry results of dead BT579 cells infected with control vector, gRNA1 and gRNA2 and treated with or without doxycycline, respectively.

FIG. 3d shows that BT549 cell apoptosis significantly increases with gRNA molecules s and dox. The result indicates that NIP7 depletion induced apoptosis of TNBC cells.

Figure 3E:
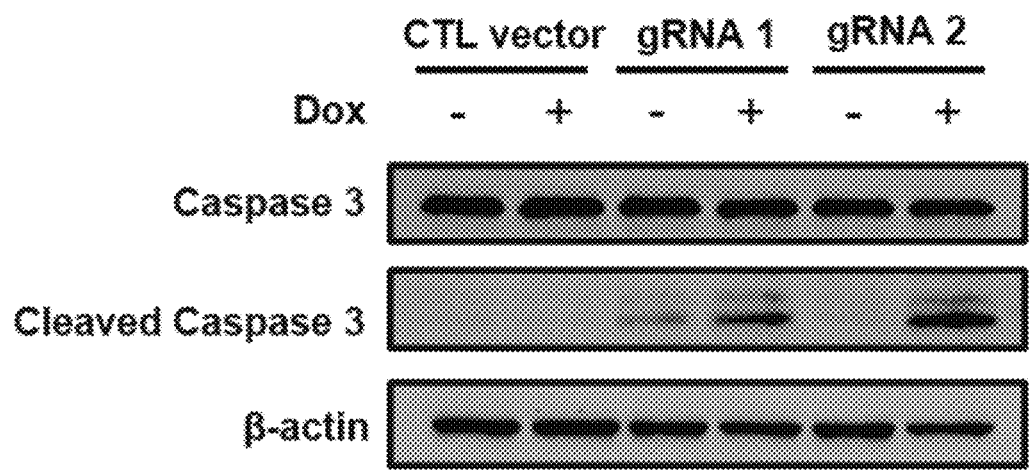
FIG. 3e is the immunoblot of caspase 3, cleaved caspase 3 and β-actin in BT579 cells infected with control vector, gRNA1 and gRNA2 and treated with or without doxycycline, respectively.

FIG. 3e further evaluates the cleaved caspase 3 protein (an apoptotic marker) in these cells. It demonstrates that the levels of cleaved caspase 3 protein are much higher in the groups infected with gRNA molecules and treated with dox. The results show that NIP7 depletion induces apoptosis of TNBC cells.

Figure 4A:
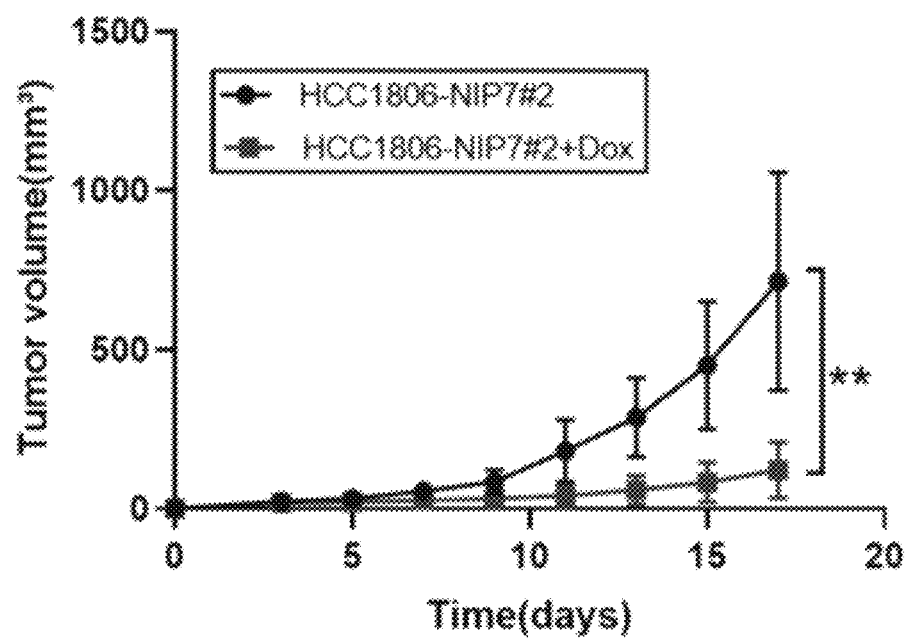
FIG. 4a is a graph showing the change in tumor volumes of mice injected with HCC1806-NIP7 #2 treated with or without doxycycline.

FIG. 4a is a graph showing that the tumor volumes of mice injected with HCC1806-NIP7 #2 and dox are much smaller than those injected with HCC1806-NIP7 #2 only. It is believed that the inhibition of NIP7 achieved by gRNA2 significantly suppresses HCC1806 tumor growth. The same conclusion can be made from FIG. 4b for tumor weights. FIG. 4c gives representative tumor images of the HCC1806-NIP7 #2 group to compare the two groups. These results demonstrate that knocking out NIP7 by gRNA molecules can decrease HCC1806 tumor sizes markedly.

Figure 4B:
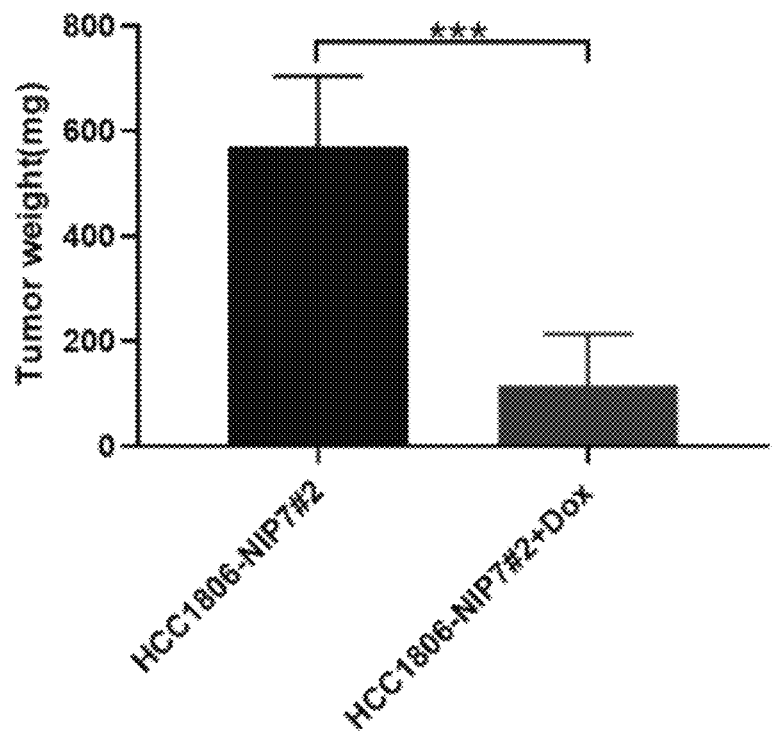
FIG. 4b is a graph showing the change in tumor weights of mice injected with HCC1806-NIP7 #2 treated with or without doxycycline.
Figure 4C:
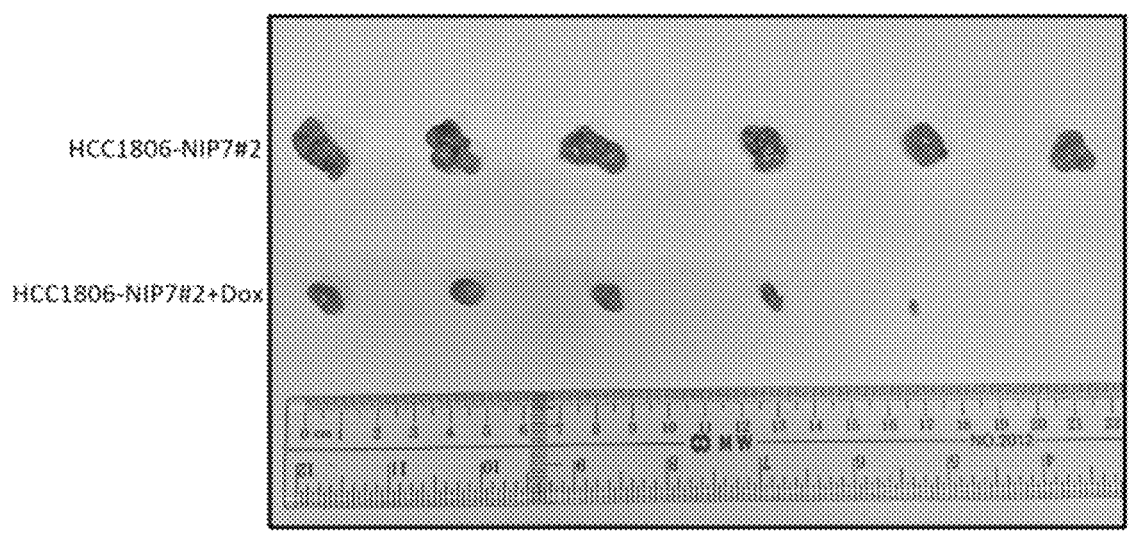
FIG. 4c shows representative tumor images of mice injected with HCC1806-NIP7 #2 treated with or without doxycycline.
Figure 4D:
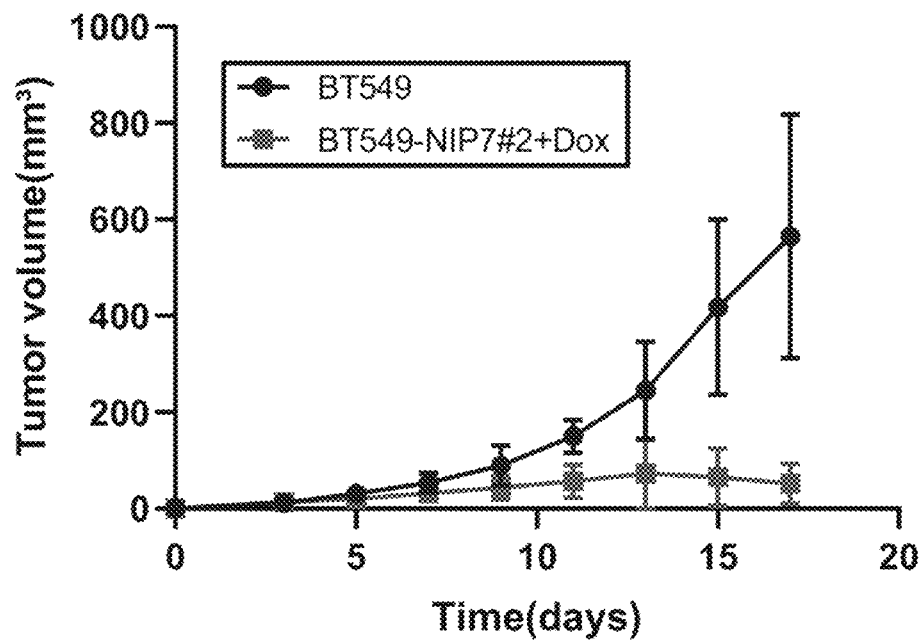
FIG. 4d is a graph showing the change in tumor volumes of mice injected with BT549-NIP7 #2 treated with or without doxycycline.

FIG. 4d is a graph showing that the tumor volumes of the mice injected with BT549-NIP7 #2 and dox are much smaller than those injected with BT549-NIP7 #2 only. The result shows the inhibition of NIP7 achieved by gRNA2 also significantly suppresses BT549 tumor growth. The same conclusion can be made from FIG. 4e for tumor weights. It is believed that knocking out NIP7 by gRNAs molecules can markedly decrease BT549 tumor sizes.

Example 1

Preferential Overexpression of NIP7 in TNBC

The inventors utilized multiple bioinformatics approaches to identify novel TNBC-specific oncogenes successfully. The clinically-annotated breast cancer gene expression datasets (TCGA; n=405) shows that NIP7 mRNA is upregulated in 3% of luminal breast tumors. Its expression is significantly higher in 26% of TNBCs (FIG. 1a). Without intending to be limited by theory, it is believed that NIP7 expression does not upregulate in other subtypes of breast cancers. In addition, non-TNBC cell lines (T47D, MCF-7, ZR-75-1, BT474), TNBC cell lines (MDA-MB-468, HCC38, HCC1143, HCC70, HCC1806, BT549, Hs578T, SUM159PT, MDA-MB-231, MDA-MB436) and MCF10-DCIS cell lines are seeded to 10-cm plates. When cells reach about 70% confluency, cells are harvested for immunoblotting to detect NIP7 expression, while β-actin is used as a loading control. Anti-NIP7 antibody (ABclonal #A4734 abconal.com) and anti-β-actin (CST #3700S, www.cellsignal.com) are used. The immunoblotting shows that, in the panel of breast tumor lines, protein expression levels of NIP7 are higher in TNBC lines than in luminal or Her2-overexpressed lines (FIG. 1b). In FIG. 1b, BL1 refers to basal-like 1; BL2 refers to basal-like 2; M refers to mesenchymal-like; MSL refers to mesenchymal stem-like. Importantly, it is believed that NIP7 overexpression is a predictor of poor survival in breast cancer patients (FIGS. 1c-1e). The data is analyzed from the Metabric dataset via the Breast Cancer Integrative Platform. Proteomic expression profiles from the UALCAN database show that protein levels of NIP7 in TNBC tumors are significantly higher than those in normal tissue samples adjacent to TNBC primary tumors (UALCAN database, FIG. 1f). Z-values stand for standard deviations from the median across samples for the given cancer type in FIG. 1f. The results show that NIP7 is well suited to be targeted for therapeutic purposes.

CRISPR/Cas9 System with gRNA Molecules

Example 2

Design of gRNA Molecules

CRISPR/Cas9 technology is a powerful gene-editing technology. The Cas9 proteins are enzyme acting like molecular scissors to cut DNA at a specific location. The cutting location on the genome is specified by gRNA molecules. Once the DNA is cut, the cell's natural repair machinery repairs the cut, a process that can disrupt a disease-causing gene and prevent the expression of that particular gene. Here, this invention establishes CRISPR/Cas9 system and designs two gRNA molecules to knock out the NIP7 gene in breast cancer.

The gRNA molecules for inhibiting the expression of the NIP7 gene include a complementary sequence to the human NIP7 gene. The complementary sequence is 20 nucleotides in length. The inhibition of the NIP7 gene includes any fragments and isoforms of NIP7. This invention designs two gRNA molecules:

```
gRNA1
SEQ ID No. 1:
5'-GTTTCCGTCTGCACAACGAC-3' gRNA2
SEQ ID No. 2:
5'-CTCACCTCACATAGTACACC-3'
```

Example 3

Preparation of Lentivector Particles with Two gRNA Molecules

Fgh1tUTG (#70183) and LentiV_Cas9_puro (#108100) vectors are ordered from Addgene (www.addgene.org). Inventors design gRNA1 and gRNA2 via ligating them to the lentiviral vector FgH1tUTG, which are digested by the BsmBI restriction enzyme (NEB, R0580S). The expression of gRNA molecules can be induced by doxycycline (dox), while the spCas9 protein is constitutively expressed.

To produce lentivector particles, psPAX2 packaging plasmid, VSVG envelop plasmid and FgH1tUTG-gRNA1/2 or LentiV_Cas9_puro are co-transfected to HEK293T cells. Below is the detailed protocol to make lentivector particles coding gRNA molecules.

On Day 1, to make a DNA mastermix, 0.6 mL serum-free and antibiotic-free DMEM (Dulbecco's Modified Eagle Medium, ThermoFisher)

7.14 µg psPAX2 (Gag/Pol, 0.42 µg/µL), 2.38 µg VSVG (Envelope, coat proteins, 0.1 µg/µL) and 9 µg FgH1t vectors are added for preparation. PEI (Polyethylenamine) is added to 0.6 mL serum-free and antibiotic-free DMEM (DNA: PEI=1 µg:3 µg). The diluted PEI is added to the diluted DNA gently. The solution is gently agitated to mix. Then the upper mixture is incubated at room temperature for 15 minutes.

293T cells are trypsinized (1 mL trypsin per 10 cm plate). Trypsin is inactivated with 9 mL (per plate) 10% FBS/DMEM (no pen/strep) and the number of cells counted. 293T cells are spun down, and the 293T cells are resuspended. The cell density is adjusted to be 1×107 cells/8 mL. 8 mL of cells are transferred in a 15-ml falcon tube and then mixed with the incubated DNA solution prepared before. The mixture is added to 10-cm plates and incubated in a virus incubator for 48 h.

On Day 3, the medium containing the lentivector particles is filtered by a 0.45-µm filter, made into 1-ml aliquots, and stored at −80° C.

Example 4

Establishing BT549-Fgh1tUTG-LentiV_Cas9_Puro and HCC1806-Fgh1tUTG-LentiV_Cas9_Puro Cell Lines with the Lentivector Particles BT549 and HCC1806 (ATCC.org) are maintained in RPMI-1640 medium supplemented with 10% tet-free fetal bovine serum. The BT549 and HCC1806 cells are seeded on a 6-cm plate. Cells are sequentially infected with the FgH1tUTG-gRNA1/2 lentivector particles and LentiV_Cas9_puro-gRNA1/2 lentivector particles.

Since FgH1tUTG codes eGFP protein and LentiV_Cas9 puro carries puromycin selection marker, Fluorescence Activated Cell Sorting (FACS) experiment is used to sort the cells with eGFP. eGFP positive cells are then infected by LentiV_Cas9_puro-gRNA1/2 lentivector particles and selected with puromycin for 7-14 days. Puromycin-resistant and eGFP-positive cells are collected and cultured.
Depletion of NIP7 Inhibits TNBC Cell Proliferation in 3D and 2D Cultures, and Colony Formation Example 5

To investigate the function of NIP7 in TNBC, a panel of breast cancer lines (BT549 and HCC1806) with tet-on doxycycline-inducible CRISPR/Cas9/gRNA-mediated knockout of NIP7 is generated. To knock out NIP7, 1×10$^6$ cells are seeded to 10-cm plates treated with or without 100 ng/ml doxycycline for 7 days, refreshing media with or without 100 ng/ml doxycycline every 3 to 4 days. Doxycycline is used to induce the transcription of gRNA molecules, which then guide the spCas9 protein to cut the targeted sequence of the NIP7 gene. After doxycycline treatment, cells are harvested, and NIP7 expression in the indicated cell lines is analyzed by immunoblotting, as shown in FIGS. 2a and 2b. gRNA1 and gRNA2 are two independent guide RNAs targeting the NIP7 gene. Upon dox administration, NIP7 is depleted significantly with two distinct gRNA molecules (FIGS. 2a and 2b).

Example 6

3D Spheroid Morphogenesis Assay 3D spheroid morphogenesis assays are the more accurately recapitulate phenotypes governing tumor growth in vivo that are routinely used to uncover distinct functions of Akt isoforms in a variety of tumor types, including breast, prostate and ovarian cancers. A 3D spheroid assay displays spheroid growth, and the schedule of the 3D spheroid assay is shown in FIG. 2c.

The detailed procedures are: From day 1 to day 7, cells are treated with or without 100 ng/ml doxycycline. On day 7, 45 µL/well Matrigel (Corning #354230, www.cornign.com/worldwide/en.html) are pre-coated to 96-well white polystyrene microplate (Corning #3610), followed by incubation in 37° C. for 30 mins to solidify the Matrigel. Cells are resuspended in assay medium (10% tet-free FBS RPMI-1640 (Sigma-Aldrich) containing 2% Matrigel), then 1500 cells/well are seeded, and the assay medium is refreshed every 4 days. On day 15, pictures are captured using a phase-contrast microscope. A notable change in morphology after the knockout of NIP7 is observed in both two cell lines. Meanwhile, the spheroid density of BT549 and HCC1806 pretreated with doxycycline are markedly decreased, as indicated by FIGS. 2d and 2e. These data demonstrate that depletion of NIP7 in TNBC lines potently inhibits cell proliferation in 3D cultures. Conversely, dox administration in vector-control cells does not affect proliferation. (FIGS. 2d and 2e).

Example 7

CellTiter-Glo 2D Cell Viability Assay

A CellTiter-Glo 2D cell viability assay (Promega #G7571, worldwide.promega.com) is used to determine cell growth. From day 1 to day 7, cells are treated with or without 100 ng/ml doxycycline. On day 7, BT549 cells are seeded in a 96-well plate (Corning #3610) at the density of 3000 cells per well. Cells are cultured in the 96-well plate for 4 days. On day 5, 50 µL reagent is added to each well, followed by incubation on a shaker for 2 minutes and after 10 minutes. The chemiluminescence signal is read by a multifunctional microplate reader (BioTek Synergy™ H1 Microplate Reader, Agilent). Cell proliferation is assessed by cell titer Glo assay. FIG. 2f shows that NIP7 knockout in BT549 cells leads to a significant decrease in cell proliferation compared to non-dox-treated cells. The data demonstrate that depletion of NIP7 in TNBC lines also potently inhibits cell proliferation in 2D cultures. Conversely, dox administration in vector-control cells has no effect on proliferation. (FIG. 2f)

Example 8

Clonogenic Assay

The clonogenic assay is applied to determine colony formation abilities of NIP7-depleted and control cells. From day 1 to day 7, BT549/HCC1806-FgH1tUTG(vector CTL)-LentiV_Cas9_puro, BT549/HCC1806-FgH1tUTG-gRNA1-LentiV_Cas9_puro and BT549/HCC1806-FgH1tUTG-gRNA2-LentiV_Cas9_puro cells are treated with or without 100 ng/ml doxycycline, and the medium with or without 100 ng/ml doxycycline is refreshed every 3 to 4 days. On day 7, 1000 cells/well are seeded to a 6-well plate, and 10% tet-free FBS RPMI-1640 medium is refreshed every 4 to 5 days.

Cells are cultured for 12 to 24 days and then fixed with 4% formaldehyde at room temperature for 10 mins, followed by 0.1% crystal violet (in ethanol) staining for about 30 mins at room temperature. The plates are washed by PBS three times to remove unstained crystal violet, and then pictures are captured. The colony number is counted after 12-24 days. The results show that knockout of NIP7 significantly inhibits colony formation ability of both BT549 (FIG. 2g) and HCC1806 cells (FIG. 2h). Furthermore, NIP7 knockout potently inhibits colony formation of TNBC cancer cells in a clonogenic assay (FIGS. 2g and 2h), demonstrating its critical role in regulating the progeny producing capability of TNBC cells.

NIP7 expression is essential for TNBC spheroid Maintenance and Growth

Example 9

3D Spheroid Maintenance Assay and CellTiter-Glo 3D Cell Viability Assay

A spheroid maintenance assay is used to determine whether the depletion of NIP7 can influence the maintenance of tumor spheroids. And the simplified procedure is shown in FIG. 3a. CellTiter-Glo 3D cell viability assay (Promega #G9682) quantifies 3D spheroid growth.

The detailed procedures are as follows: On day 1, 45 μL/well Matrigel (Corning #354230) is pre-coated to 96-well white polystyrene microplate (Corning #3610), followed by incubation at 37° ° C. for 30 mins to solidify the Matrigel. Cells are resuspended in assay medium (10% tet-free FBS RPMI-1640 containing 2% Matrigel), and then 1500 cells/well are seeded. The assay medium is refreshed every 4 days. Cells are grown in 3D spheroid for 7 days followed by 100 ng/ml doxycycline treatment or not for 7 days. On day 14, representative phase-contrast images of BT549 spheroids are captured using a phase-contrast microscope indicated in FIG. 3b.

Spheroid growth is assessed by a 3D cell titer Glo assay. On day 15, 100 μL 3D CellTiter Glo reagent (Promega #G9682) is added to each well. The wells are incubated at room temperature for 15 mins, and then the chemiluminescence signals are read by a multifunctional microplate reader (BioTek Synergy™ H1 Microplate Reader). FIG. 3c shows that NIP7 knockout in BT549 cells leads to a significant decrease in spheroid growth compared to non-dox-treated cells in 3D culture. With the inducible knockout strategy, NIP7 depletion induces tumor spheroid disintegration of TNBC (FIGS. 3b and 3c).

Example 10

AnnexinV/PE-Cy7 Staining and Flowcytometry

BT549 cells containing NIP7 gRNA or empty vector are treated with or without dox for 7 days, followed by Annexin V/PE-Cy7 staining and flow cytometry. AnnexinV/PE-Cy7 staining and flowcytometry are used to determine cell apoptosis.

From day 1 to day 7, BT549-FgH1tUTG (vector CTL)-LentiV_Cas9_puro, BT549-FgH1tUTG-gRNA1-LentiV_Cas9_puro and BT549-FgH1tUTG-gRNA2-LentiV_Cas9_puro cells are treated with or without 100 ng/ml doxycycline. The medium with or without 100 ng/ml doxycycline is refreshed every 3 to 4 days. On day 7, adherent cells are collected and suspended in the medium. And then, cell numbers are counted, and $7\times10^6$ cells per group are taken. Cells are then spun down at 2000 rpm for 4 minutes at room temperature, and the medium is discarded. The cells are washed by 1× binding buffer and then spun down. The 1× binding buffer is discarded, and then "0.25 mL 1× binding buffer and 2.5 μL AnnexinV-PE/Cy7" are added to each sample. The cells are incubated at room temperature for 15 mins, and spun down at 2000 rpm for 4 minutes. The supernatant is discarded. The cells are resuspended with 0.4 mL 1× binding buffer and then analyzed by flowcytometry. PC7 channel (780/60 BP) is used to capture AnnexinV-PE/Cy7 signals. FIG. 3d displays that NIP7 knockout in BT549 leads to a significant increase in cell apoptosis.

Levels of apoptotic marker cleaved caspase 3 in the indicated BT549 cells are determined by immunoblotting. FIG. 3e shows that NIP7 knockout in BT549 leads to a significant elevation of the cleaved caspase 3 level. Cleaved caspase 3 is an apoptotic marker. Therefore, with the inducible knockout strategy, NIP7 depletion induces apoptosis of TNBC cells.

NIP7 Plays an Essential Role in the Tumor Growth of TNBC Xenografts in Mice

Example 11

Xenograft Experiment 6-week-old female nude mice are purchased from the City University of Hong Kong. Mice are randomly grouped into two groups for either injection of HCC1806 or BT549 cell line.

BT549- and HCC1806-FgH1tUTG-gRNA2-LentiV_Cas9_puro cells (hereinafter called BT549-NIP7 #2 and HCC1806-NIP7 #2) are seeded on 15-cm plates, treated with or without 100 ng/ml doxycycline for 7 days. The medium with or without 100 ng/ml doxycycline is refreshed every 3 to 4 days. On Day 7, 2 mL trypsin is added to each plate to detach cells. Cells are collected and counted, followed by three times PBS washing. Then cells are resuspended by 50% Matrigel (Corning #356237) in PBS to make the cell density $10\times10^6$ cells/100 μL for BT549-NIP7 #2 or $7\times10^6$ cells/100 μL for HCC1806-NIP7 #2. NIP7 knockout in HCC1806 TNBC cells is induced by dox treatment for 7 days. The HCC1806 tumor cells are then injected into the mammary fat pad of nude mice (n=6). BT549 TNBC cells containing NIP7 gRNA (+/−dox) are injected into nude mice (n=2). Each injection contains $10\times10^6$ cells for BT549-NIP7 #2 groups or $7\times10^6$ cells for mice of HCC1806-NIP7 #2 groups. Tumor volumes (FIGS. 4a and 4d) and weights (FIGS. 4b and 4e) are measured every 2-3 days. Representative tumor images of the HCC1806-NIP7 #2 group are shown in FIG. 4c.

Figure 4E:
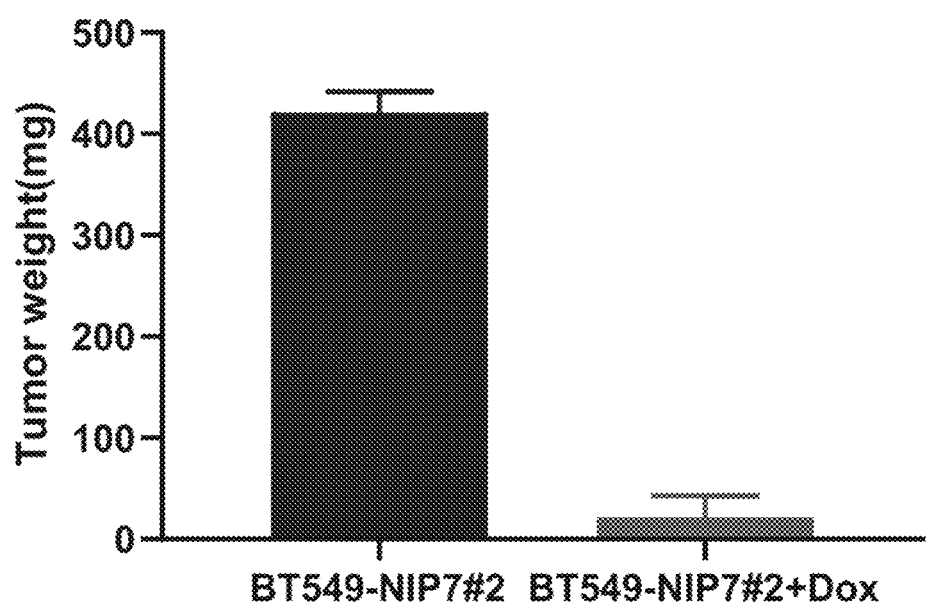
FIG. 4e is a graph showing the change in tumor weights of mice injected with BT549-NIP7 #2 treated with or without doxycycline.

Without intending to be limited by theory, it is believed that FIGS. 4a-4c show that knocking out NIP7 by gRNA molecules can lead to markedly decreased HCC1806 tumor sizes. Furthermore, it is believed that FIGS. 4d and 4e show that knocking out NIP7 by gRNA molecules can also reduce BT549 tumor size significantly. An injection of $5\times10^8$ transduction units per mouse intravenously can achieve a good expression of the target (Van den Brand B T, Vermeij E A, Waterborg C E, et al., 2013). The invention performs preclinical studies and demonstrates that NIP7 knockout significantly inhibits HCC1806 and BT549 TNBC xenograft growth (FIGS. 4a-4e). In humans, lentiviral vectors containing gRNAs could be injected into the subjects. Tumor cells could then take up the lentiviral vectors and gRNAs could be expressed inside the tumor cells. The data indicate that gRNA molecules against NIP7 are a novel therapeutic strategy for TNBC, particularly for tumors overexpressing NIP7.

Without intending to be limited by theory, it is believed that NIP7 knockout by gRNA molecules in treating a cancer or a tumor can be used in combination with other cancer therapies or drugs. A potential combination would include, but not limited to, PI3K/Akt pathway inhibitors, CDK4/6 inhibitors (e.g., Palbociclib, Ribociclib, etc.), MEK inhibitors (e.g., Binimetinib, Trametinib, etc.) and immune checkpoint inhibitors (CTLA-4 inhibitors, PDL1 inhibitor, etc.). Also, NIP7 knockout by gRNA molecules and chemotherapy, such as chemotherapeutic agents (paclitaxel, cisplatin, etc.), can be applied in combination. PI3K/Akt pathway inhibitors include PI3K inhibitors (e.g., Alpelisib, Duvelisib, etc.), Akt inhibitors (e.g., Ipatasertib, Capivasertib, etc.) and mTOR inhibitors (e.g., MLN0128, Vistusertib, etc.).

It should be understood that the above only illustrates and describes examples whereby the present invention may be carried out, and that modifications and/or alterations may be made thereto without departing from the spirit of the invention.

It should also be understood that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

All references specifically cited herein are hereby incorporated by reference in their entireties. However, the citation or incorporation of such a reference is not necessarily an admission as to its appropriateness, citability, and/or availability as prior art to/against the present invention.

---

What is claimed is:

1. A method of inhibiting NIP7 gene expression in a triple-negative breast cancer cell, comprising administering a gRNA molecule and a Cas9 protein into the triple-negative breast cancer cell, wherein the gRNA molecule comprises a sequence complementary to a NIP7 gene, and wherein the gRNA molecule and the Cas9 protein disrupt expression of the NIP7 gene.

2. The method of claim 1, wherein the gRNA molecule comprises a sequence selected from the group consisting of SEQ ID NO. 1, SEQ ID NO. 2 and a combination thereof.

3. A method of inhibiting NIP7 gene expression in a triple-negative breast cancer cell, comprising administering a lentivector particle into the triple-negative breast cancer cell, wherein the lentivector particle encodes a gRNA molecule and a Cas9 protein, wherein the gRNA molecule comprises a sequence complementary to a NIP7 gene, and wherein the gRNA molecule and the Cas9 protein disrupt expression of the NIP7 gene.

4. The method of claim 3, wherein the lentivector particle further comprises a promoter for expressing the gRNA molecule.

5. A method of treating or controlling a cancer or tumor mediated by NIP7 overexpression in a subject, comprising administering an effective amount of a gRNA molecule and a Cas9 protein to the subject, wherein the gRNA molecule comprises a sequence complementary to a NIP7 gene, and wherein the gRNA molecule and the Cas9 protein disrupt expression of the NIP7 gene.

6. The method of claim 5, wherein the gRNA molecule comprises a sequence selected from the group consisting of SEQ ID NO. 1, SEQ ID NO. 2 and a combination thereof.

7. A method of treating or controlling a cancer or tumor mediated by NIP7 overexpression in a subject, comprising administering an effective amount of a lentivector particle to the subject, wherein the lentivector particle encodes a gRNA molecule and a Cas9 protein, wherein the gRNA molecule comprises a sequence complementary to a NIP7 gene, and wherein the gRNA molecule and the Cas9 protein disrupt expression of the NIP7 gene.

8. The method of claim 7, wherein the lentivector particle further comprises a promoter for expressing the gRNA molecule.

9. The method according to claim 5, wherein the cancer is triple-negative breast cancer.

10. The method according to claim 5, further comprising administering an effective amount of an additional agent selected from the group consisting of a PI3K/Akt pathway inhibitor, a CDK4/6 inhibitor, a MEK inhibitor, a CTLA-4 inhibitor, a PDL1 inhibitor, a chemotherapeutic agent, and a combination thereof.

11. A pharmaceutical composition for treating triple-negative breast cancer comprising:
an effective amount of a gRNA molecule and a Cas9 protein, wherein the gRNA molecule comprises a sequence complementary to a NIP7 gene, and wherein the gRNA molecule and the Cas9 protein disrupt expression of the NIP7 gene; and an effective amount of an additional agent selected from the group consisting of a PI3K/Akt pathway inhibitor, a CDK4/6 inhibitor, a MEK inhibitor, a CTLA-4 inhibitor, a PDL1 inhibitor, a chemotherapeutic agent, and a combination thereof.

12. The pharmaceutical composition according to claim 11, wherein the gRNA molecule comprises a sequence selected from the group consisting of SEQ ID NO. 1, SEQ ID NO. 2 and a combination thereof.

13. A pharmaceutical composition for treating triple-negative breast cancer comprising:
an effective amount of a lentivector particle, wherein the lentivector particle encodes a gRNA molecule and a Cas9 protein, wherein the gRNA molecule comprises a sequence complementary to a NIP7 gene, and wherein the gRNA molecule and the Cas9 protein disrupt expression of the NIP7 gene; and
an effective amount of an additional agent selected from the group consisting of a PI3K/Akt pathway inhibitor, a CDK4/6 inhibitor, a MEK inhibitor, a CTLA-4 inhibitor, a PDL1 inhibitor, a chemotherapeutic agent, and a combination thereof.

14. The pharmaceutical composition according to claim 13, wherein the lentivector particle further comprises a promoter for expressing the gRNA molecule.

15. The pharmaceutical composition according to claim 14, wherein the promoter is H1 promoter.

16. The pharmaceutical composition according to claim 11, further comprising a pharmaceutically-acceptable agent selected from the group consisting of a carrier, an adjunct, a filler, a coating, a preservative, and a combination thereof.

* * * * *

SEQUENCE LISTING

```
Sequence total quantity: 3
SEQ ID NO: 1            moltype = RNA  length = 20
FEATURE                 Location/Qualifiers
source                  1..20
                        mol_type = other RNA
                        organism = synthetic construct
ncRNA                   1..20
                        ncRNA_class = guide_RNA
SEQUENCE: 1
gtttccgtct gcacaacgac                                              20

SEQ ID NO: 2            moltype = RNA  length = 20
FEATURE                 Location/Qualifiers
source                  1..20
                        mol_type = other RNA
                        organism = synthetic construct
ncRNA                   1..20
                        ncRNA_class = guide_RNA
SEQUENCE: 2
ctcacctcac atagtacacc                                              20

SEQ ID NO: 3            moltype = DNA  length = 3335
FEATURE                 Location/Qualifiers
source                  1..3335
                        mol_type = genomic DNA
                        organism = Homo sapiens
SEQUENCE: 3
gacttccgtt tccagttacc aaggcacgag gatccggtgt tccaacccag ggggaaaaat   60
gcggcctttg actgaagagg agacccgtgt catgtttgag aagatagcga aatagtagga  120
gcgcgcgggg cggacgcggg agtgtgtggg tgtggtggcc aagggtggag tggggcgcg   180
gtgccggaga ccggttcgtt cgggcgcggt ctccagtcct cttttttgccc tcagcattgg  240
ggagaatctt caactgctgg tggaccggcc cgatggcacc tactgtttcc gtctgcacaa  300
cgaccgggtg tactatgtga ggtgaggcgg ggccgggcag gcagcatgga cccaggggag  360
aggggtcctg ggtcccacga gcctccttca tccgcaacct tgctcccct ttacccttt    420
agtgagaaga ttatgaagct ggccgccaat atttccgggg acaagctggt gtcgctgggg  480
acctgctttg gaaaattcac taaaacccac aagtttcggt tgcacgtcac agctctggat  540
taccttgcac cttatgccaa ggtttgtggg gcggtttcca attctgccac gggcgatgaa  600
gtcaaggatt aggcagattg tccggcagct tctctcccac agagtccctg acagtgtgct  660
tggaggagtt tcagcacatg gagatgtgta gaggtcttgc agcttgagca tggtcagggc  720
tatgggatag gaatgctatg tggctgcgta gggttagttt tctccagcga agtagaagag  780
cctagggaga cccagctaga gatcagaaag caaataagtg gcagcaatga agacaccggg  840
gtccagaaaa agagctgtta acctggccat ggaggatgat ccttgtagag ttgagaaaat  900
aactttttct attttttttct ttttcttct tgctctgttt tttcttttca tttctctttc   960
tcttcttcc tgacacagtt tcactctgtc gcccaggcca gagtgcagtg gtgcgatctc  1020
actgcagcct ccactttcca gtttccagtg attcttgtgc ctcagtagct gggattacag  1080
gcatgtgcca ccacacctgg ctgatttttt tgtgtgtttt tagtagagac agtgtttcac  1140
tgtgttggcc aggctggtct cgaactcctg gcctcaagtg atccacctgc cttggcctcc  1200
caaagtgctg ggattacaag cgtgagccac tgcaccgggc aacttcctgc attctgttc  1260
aggagataga cagtttgagg aaaacatgag tctctctgtt tcccttaaaa ttatttcaga  1320
aaattattca cagatccagc agctagcttg tctgcatgga tagaaatagt aacgtttta   1380
tgtctcttgg atttaattc tcttatagta taaagtttgg ataaagcctg gtgcagagca  1440
gtccttcctg tatgggaacc atgtgttgaa atctggtctg ggtcgaatca ctgaaaatac  1500
ttctcagtac cagggcgtgg tggtgtactc catggcagac atcccttgg tgagtagaga  1560
tggtagctgt tacagaactc aagtactctt attcaagaag ggtatgtctt caatctgagt  1620
gcttgagaga ataaattctc agcacgtttt gaatcccaga aagaccagaa ctgtatttt   1680
tccgtctttg ttatttccag ccctcaatat gggcatattg aatgacttca gtgagttagt  1740
gtctcttctt ttgaatccca gggttttggg gtggcagcca aatctacaca agactgcaga  1800
```

```
aaagtagacc ccatggcgat tgtggtattt catcaagcag acattgggga atatgtgcgg  1860
catgaagaga cgttgactta aaacgaagcc attccaagga cagacggctg tatggaaagg  1920
ccgagctttg tttcctgtgt ttgtgtggac tccaccatca tgttgaattt tgtcaacact  1980
ctggcctctt cagggacttc ttatttactg tactctctat cactgacaaa tgcaggctgg  2040
attcttatta tatacagaga tggctcaaaa atggggtttc agatctttgt gacgaaatag  2100
aatactgttt catatttgaa tcagagggct tcttgttctg agaaataggt tcaaaatcat  2160
tggaaccagg aacaagaata gcttattgtt atctgtgata acactgtttt ctaaacacaa  2220
ggattttctt ttttattaat atgcaacata gacattgcca taacagaata ataaaccaca  2280
tgtggggttt taaaaatgaa attggctaa taggagcaat tcagctattt ttctatacag  2340
taattggtgt gtggtataga agaaaaacgg gttcaaaccc cacttctgcc acctaccagc  2400
tatatggcct tgaatgagtc attcagcttt aataaggttc attttcttct gtttaaaaag  2460
acacaaaact tgaaaatcag ctttggccat ctacctgaga attagaaagt ctgattttg   2520
gaattagaaa tcatgattgt aggctgggca cagtggctcg cgcctgtaat cccagcactt  2580
tgggaggcca aggcggacgg atcacttgag gttaggagtt tgagaccagc ctggccaaca  2640
tggtgaaacc ccatctctac taaaaaaaaa aaaaaaatta ggtgtggtga cacatggctg  2700
tggtcctagt tacttgggag gctgaggcag gagaatggct tgaactgggg aagcagagct  2760
tgcagtgagc caagatggtg ccattgcact ccagcctggg cgtgacagag tgagactcca  2820
tctgattgta aagcatctag tacagtgtac agtgccttgg aaatgatagg tatggaataa  2880
atggtaatta tttttatatt atatatatta tgtattcctg ttattaagtg tagagttta   2940
tgagtataat ttgattttat taccttcttt tttacaagct gttttctcag tattttctt   3000
ggatgggatg acgctaggct ggaaagtttt tttcatcact atgattttat aaaacaattt  3060
tttctatgaa cctttactta cttgactgga ttggactaaa agcactgatc agaggccacg  3120
acataaaaat tcagtcccct tgtccttccc cgtgcctccc aaagttactt taagatcctt  3180
agaatatttc tttaaatatt ttatagacaa aaaatttaaa gactatctgt attgcaaaat  3240
taaactattt cttaatgaa tatattgctt attttaagtt ccaaaggtga agtctttaag   3300
aataaaacat taccaactcc tgcttttata tgtaa                             3335
```